(12) United States Patent
Hochmuth et al.

(10) Patent No.: US 7,500,069 B2
(45) Date of Patent: Mar. 3, 2009

(54) SYSTEM AND METHOD FOR PROVIDING SECURE ACCESS TO NETWORK LOGICAL STORAGE PARTITIONS

(75) Inventors: Roland M. Hochmuth, Fort Collins, CO (US); Robert Paul Martin, Fort Collins, CO (US); Alassane Sene, Fort Collins, CO (US); Bryan Prouty, Wellington, CO (US); Stuart Yoshida, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1836 days.

(21) Appl. No.: 09/954,352

(22) Filed: Sep. 17, 2001

(65) Prior Publication Data

US 2003/0056063 A1 Mar. 20, 2003

(51) Int. Cl.
*G06F 12/00* (2006.01)
*G06F 13/00* (2006.01)

(52) U.S. Cl. ...................... 711/152; 711/161

(58) Field of Classification Search ............... 709/203, 709/213, 124, 215, 223, 225, 226, 229; 711/154, 711/161, 163, 112, 114, 153, 173, 152; 713/201; 345/544
See application file for complete search history.

(56) References Cited

U.S. PATENT DOCUMENTS

| | | | |
|---|---|---|---|
| 3,331,058 A * | 7/1967 | Perkins, Jr. ................ 711/115 |
| 5,561,768 A * | 10/1996 | Smith ........................... 712/13 |
| 5,664,109 A * | 9/1997 | Johnson et al. ................ 705/2 |
| 5,764,908 A * | 6/1998 | Shoji et al. ................... 709/217 |
| 6,067,545 A * | 5/2000 | Wolff ........................... 707/10 |
| 6,141,759 A * | 10/2000 | Braddy ......................... 726/14 |
| 6,421,711 B1 * | 7/2002 | Blumenau et al. ........... 709/213 |
| 6,732,104 B1 * | 5/2004 | Weber .......................... 707/10 |
| 6,792,519 B2 * | 9/2004 | Constable et al. ........... 711/163 |
| 2002/0133534 A1 * | 9/2002 | Forslow ....................... 709/200 |

OTHER PUBLICATIONS

Hagn et al., Mobile Teleworking Some Solutions and information Security aspects, 2000.*
Khalil et al., Implementation of a Bandwidth Broker for Dynamic End-to-End Resource Reservation in Outsourced Virtual Private Networks, Jun. 2000.*
Przygienda et al., Proxy PNNI augmented routing (proxy PAR), Feb. 1998.*

(Continued)

*Primary Examiner*—Hyung S Sough
*Assistant Examiner*—Mardochee Chery (57) ABSTRACT

A method for providing secure access to network secure logical storage partitions is disclosed. The method comprises automatically associating at least one of a plurality of secure logical storage partitions in a storage device in a network with at least one of a plurality of uniquely identified servers in a cell in the network in response to a request for storage over the network. The method also comprises automatically associating the cell with at least one client using network isolation of the cell, and using network isolation of the storage device to restrict access to at least one of the plurality of secure logical storage partitions to the one of the plurality of uniquely identified servers in the cell. In a particular embodiment, the method also comprises determining whether storage capacity is available for the at least one client in response to the request, and automatically creating the cell if the cell does not already exist.

26 Claims, 3 Drawing Sheets

OTHER PUBLICATIONS

Knight et al. Layer 2 and 3 Virtual Private Networks: Taxonomy, Technology, and Standardization efforts, Jun. 2004.*

Guo et al., Optimal Customer Provisioning in Network-Based Mobile VPNs, Apr. 2004.*

Kourai et al., Secure and Manageable Virtual Private Networks for End-users, Mar. 2003.*

Bush et al., Integrity for Virtual Private Routed Networks, Feb. 2003.*

* cited by examiner

SYSTEM AND METHOD FOR PROVIDING SECURE ACCESS TO NETWORK LOGICAL STORAGE PARTITIONS

RELATED PATENT APPLICATION

This application is related to co-pending U.S. patent application Ser. No. 09/972,408 entitled "System and Method for Dynamic Configuration of Network Resources" filed Sep. 17, 2001.

TECHNICAL FIELD OF THE INVENTION

The present invention relates in general to computer systems and, more specifically, to a system and method for providing secure access to network logical storage partitions.

BACKGROUND OF THE INVENTION

Networked systems now provide a ubiquitous computing environment for many applications. As one example, application or storage service providers (XSPs) may provide computer processing capability and applications for customers and users on an as-needed basis. Through secure Internet connections, customers may seamlessly access these resources, as if they were part of their own network infrastructure. A client may rely exclusively on an XSP to provide access to applications or use the XSP to supplement their own resources as needed.

Most clients are typically very security-conscious when using networked systems. For example, these customers are typically concerned that other clients will be able to see, copy or corrupt their data as it travels to or from or is processed on an XSP computer system. An XSP may provide a form of security by using servers with comprehensive access control lists. Currently, many methods used by XSPs usually result in poor performance of many applications and usually do not provide physical isolation or encryption of client data.

Traditional systems and methods also may provide storage over a network such as the Internet by either assigning storage devices to each machine or by providing a pool of storage devices that may be shared among customers and users. Both of these solutions suffer from disadvantages. For example, assigning exclusive storage devices to a customer on a per-cell or per-system basis may result in a complex and difficult-to-manage computer infrastructure, and is typically burdensome to administer. In many cases, in order to safely preserve each customer's data each storage device may only be accessed or leased to one customer at a time. This can result in poor utilization of storage resources as customers are given access to more storage than they actually need. Furthermore, redeployment of resources to other cells requires physical re-configuration and reconnection of devices, resulting in expensive variable costs for XSPs.

Pools of storage devices have also traditionally been used to provide availability of the devices to customers or users on a non-exclusive basis. These pools may reduce costs and manageability issues, but these systems typically fail to sufficiently segregate, and thus secure, data of different customers. These systems utilize application layer approaches to improve data security. But such a solution may not be easily implemented by XSP's or may not be provided by the XSP, because the client system usually requires software to enable these methods. For example, providing such security may in some cases impose burdensome requirements on XSPs to manage their customers' network access and login processes, file sharing permissions, and other security measures, and also may adversely impact the performance of the XSP systems. Moreover, XSP customers usually have or prefer to have configuration control of each machine, which allows them to add or remove any software that could otherwise be used by the XSP to provide a layer of security.

SUMMARY OF THE INVENTION

From the foregoing, it may be appreciated that a need has arisen for providing highly secure access to logical storage partitions on a network based on network and/or device isolation. In accordance with the present invention, and method and system for automating the configuration of and providing secure access to network secure logical storage partitions are provided that substantially eliminate or reduce disadvantages and problems of conventional systems.

A method for providing secure access to network logical storage partitions is disclosed. The method comprises automatically associating at least one of a plurality of secure logical storage partitions in a storage device in a network with at least one of a plurality of uniquely identified servers in a cell in the network in response to a request for storage over the network. The method also comprises automatically associating the cell with at least one client using network isolation of the cell, and using network isolation of the storage device to restrict access to at least one of the plurality of secure logical storage partitions to the one of the plurality of uniquely identified servers in the cell.

Another aspect of the invention is a secure storage access configuration module. The module comprises a processing module residing in a network and a logic module residing on the processing module. The network comprises a plurality of secure logical storage partitions in a storage device and a plurality of uniquely identified servers. The logic module is operable to receive a request for storage over the network from at least one client, automatically associate at least one of a plurality of secure logical storage partitions in the network with at least one of a plurality of uniquely identified servers in a cell in the network in response to the request, and automatically associate the cell with the at least one client using network isolation of the cell. Consequently, because clients are connected to cells, and file servers are in cells, access to the at least one of the plurality of secure logical storage partitions is restricted to the one of the plurality of uniquely identified servers in the cells by using network isolation of the storage device.

Yet another aspect of the invention is a secure network storage access system. The system comprises a secure file server module having a plurality of uniquely identified servers and a disk array module having a plurality of secure logical storage partitions that is coupled to the secure file server module. The system also comprises an administrative module coupled to the secure file server module. The administrative module is operable to automatically associate at least one of a plurality of secure logical storage partitions in the disk array module in the network with at least one of a plurality of uniquely identified servers in a cell in the network, and automatically associate the cell with at least one client using network isolation of the cell. The administrative module is also operable to use network isolation of the disk array module to restrict access to the at least one of the plurality of secure logical storage partitions to the one of the plurality of uniquely identified servers in the cell.

DETAILED DESCRIPTION OF THE DRAWINGS

Figure 1:
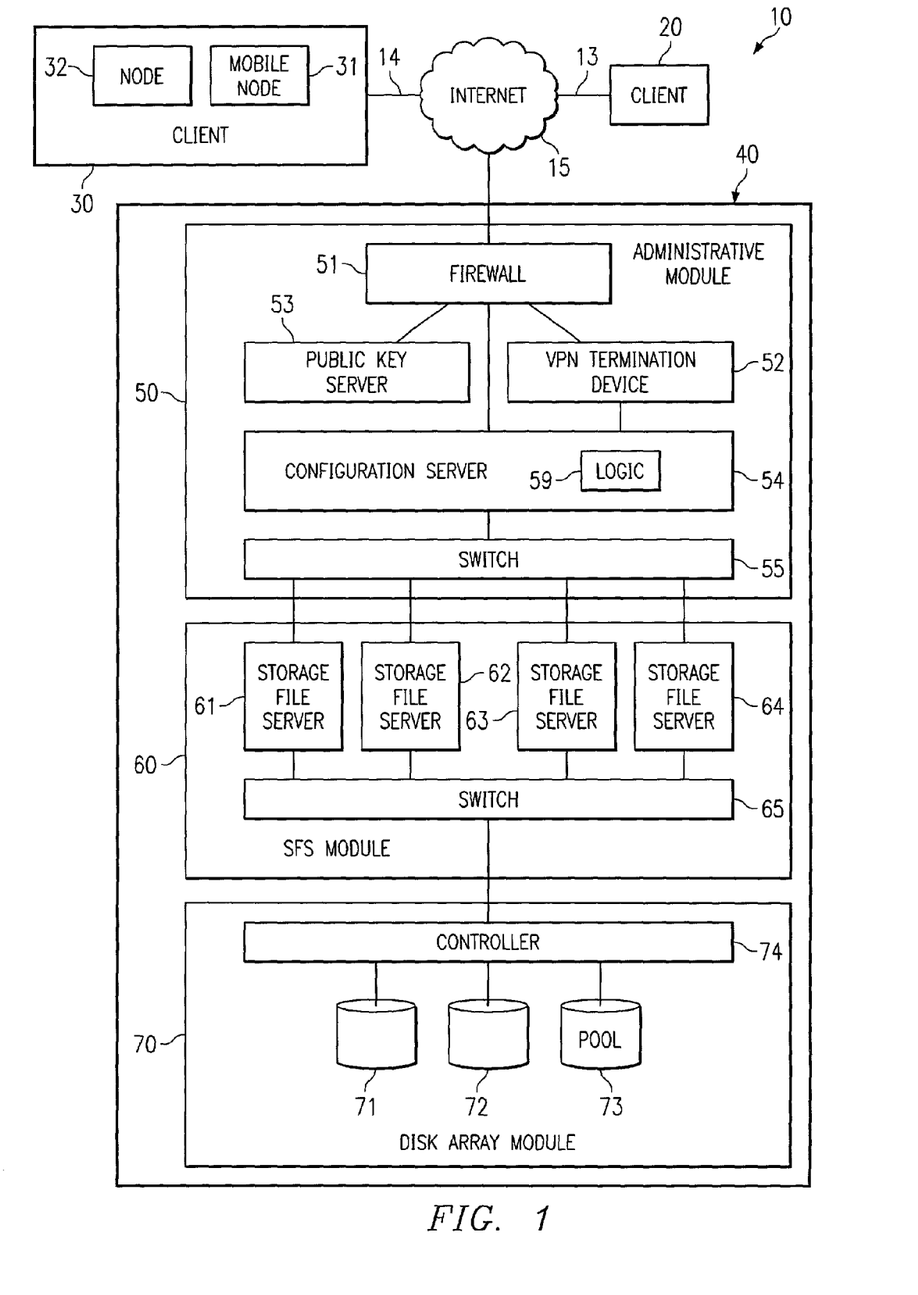
FIG. 1 is an example of a block diagram of a system that provides secure access to logical storage partitions according to an embodiment of the present invention.

FIG. 1 is an example of a block diagram of a system that provides secure access to network logical storage partitions according to an embodiment of the present invention. A logical storage partition is a division of a storage device's physical partitions into multiple sets of resources so that each set of resources may be operated independently and for environments supporting, for example, database or client/server operations. The number of logical partitions that may be created depends on the system and resources available. One example of a logical storage partition is a logical unit number (LUN) in a storage disk array, where a LUN number corresponds to a partition of a logical storage partition. A LUN may include one or more physical partitions or one or more subsets of a physical partition. A secure logical storage partition includes added capability for access control lists (ACLs) to permit or deny access to applicable parties. For example, an ACL may be applied at the data link and network layers (of the OSI 7-Layer network model), or an FC-2 layer (of a Fibre Channel standard) to provide restrictions to access at the network layer. An ACL permits or denies access to the secure logical storage partition based on a media access control (MAC) address, IP address, or Fibre Channel World Wide Name (WWN). Any number of ACLs may be applied to one or more LUNs, depending on the capabilities of the storage device. A storage device may include any media operable create, remove, and administer secure logical partitions, such as LUNs with ACLs, and apply ACLs at the data link and network layers in the OSI 7-Layer network model or in the FC-2 layer in the Fibre Channel standards. A storage device may store data and may be connected to a network and may be such as, but not limited to, optical or magnetic storage media such as disks, or media that may be part of a system, such as a disk or other memory as part of a computer or server.

The invention provides for automatically associating at least one of a plurality of secure logical storage partitions in a network with at least one of a plurality of uniquely identified servers in a cell in the network in response to a request for storage access over the network, and for automatically associating at least one of the plurality of cells with at least one client. A client may access every device within a cell to which the client is assigned, but not to other devices that are within cells to which the client is not assigned. Consequently, because clients are connected to cells, and file servers are in cells, access to at least one of the plurality of secure logical storage partitions is restricted to the one of the plurality of uniquely identified servers in the cell.

In general, the system provides a single solution for storage and/or application service providers (XSPs) that facilitates centralization and simplification of storage management. The system also allows XSPs to securely service more than one customer per secure logical storage partition while allowing the customer to have control of their computer systems. LUNs may be associated with cells that include secure file servers (SFS). Then, because clients are connected to cells, and SFS are in cells, clients will have access to the LUNs associated with the cells to which the client is connected. For example, XSPs may use secure storage access system 10 to dynamically and securely change and configure access of particular clients to a cell using a variety of methods, including network isolation techniques such as VLANs. These cells may then be associated, through techniques such as ACLs with particular secure logical storage partitions designated as LUNs 71, 72, and 73. System 10 can thus effectively maintain and update applicable databases to monitor resource consumption and appropriately bill various clients for such consumption. One method for designating a LUN is discussed in conjunction with FIG. 2.

Moreover, the present invention provides for creating an architecture that uses network isolation methods, instead of isolation at the system level (such as by operating system logins), physical level (for example, where machines are physically on separate networks), and application level (such as password protection). As one example, LUNs may be created on logical storage partitions that are connected to a network. One or more file servers in a cell may then be connected to one or more logical storage partitions by use of an isolation method such as an access control list for a VLAN at, for example, switch 55. A thusly isolated VLAN includes routing only to or from associated clients, and not to or from any other cells, external VLANs or LANs. Access of file servers to one or more LUNs is then controlled by configuring ACLs on the storage devices associated with the LUN. Such an advantage reduces disadvantages with isolation methods on the physical, system, or application level, such as system or security vulnerability, and more control over users that may otherwise reset some of the ACL values.

The invention provides several important advantages. Various embodiments of the invention may have none, some, or all of these advantages. One technical advantage of the invention is that the invention includes a secure switched network that may be used to provide access by various clients to secure logical storage partitions that provide functionality such as, but not limited to, data storage, data processing, or a combination thereof. For example, application and other service providers (XSP's) may use the system to dynamically and securely change and configure access to selected ones of secure logical storage partitions as desired, so that client data may be protected from undesirable and/or unauthorized access, viewing, copying, or modification.

Another technical advantage of the invention is that the invention includes secure access to secure logical storage partitions that provides for the network isolation of data. Generally, isolation may be provided between LUNs by utilizing network isolation, typically at the Layer 2 device level. For example, in a particular embodiment, access control lists may be used to control access via network interface cards (NICs) in an Ethernet network. The addresses in these NICs are not modifiable by a client. Such an advantage may improve the security of data available to a variety of clients, as well as the performance of technical applications used by clients of XSPs that may otherwise be provided by using traditional systems. Such advantages may also reduce costs and manageability issues while effectively segregating and securing data for each client.

Moreover, the invention may also provide the advantage of facilitating centralization and simplification of storage management. Such an advantage may provide secure, accessible data storage for clients, reducing the cost of maintaining complex computer systems for clients while insuring that sufficient computer resources are available as desired. Such an advantage may also provide each client the configuration control of each machine they typically desire, while retaining an adequate level of security and isolation of secure logical storage partitions between clients. For example, the invention may allow service providers to serve a plurality of customers who may use a single secure logical storage partition while maintaining complete control of the computer attached to the secure logical storage partition. The invention may also allow enforcement of security without requiring software to reside on computers of clients, or computers within cells in a network.

FIG. 1 illustrates a secure storage access system 10 that includes clients 20 and 30 coupled to a secure switched network 40 through a network such as the Internet 15. Secure storage access system 10 may be used to provide secure access to logical storage partitions by any number of clients, and clients may be connected to secure storage access system 10 by any suitable data transmission means, including wireless means. For example, as illustrated in FIG. 1, secure storage access system 10 includes clients 20 and 30 connected to secure switched network 40 by respective broadband connections 13 and 14 through Internet 15. Other clients 20 may be connected to secure switched network 40 by a dial-up connection across Internet 15, by a dedicated-line (not explicitly shown), through a virtual private network to maximize security of that client's data in transit, or by other methods. Secure storage access system 10 centralizes and simplifies storage management for service providers by creating a single network solution. For example, secure storage access system 10 allows clients 20 and 30 complete control of computer systems and provides them secure access to storage, and use of their data. This system also allows service providers to serve a plurality of customers who may use a single storage device while maintaining complete control of the computer attached to the storage device. The system also allows enforcement of security without requiring software to reside on machines of the clients 20 and 30.

As illustrated in FIG. 1, client 30 includes mobile node 31 and computing node 32. The term "client" may be used to refer to any computer system requiring access to secure logical storage partitions and may include, but are not limited to, independent computer systems, highly secure computer systems, workstations, servers, mobile computing devices, appliances and networks having some or all of the foregoing. A client may include one or more computer resources and utilize any software system implemented using a distributed component model or service model such as, but not limited to, e-Speak, a software infrastructure available from Hewlett Packard (HP), Enterprise Java Beans, a component model for networked and distributed systems available from Sun Microsystems, or CORBA. A client also conforms to an interface provided by a configuration server and may request access to secure logical storage partitions as desired using configuration server 54. In a particular embodiment, clients 20 and/or 30 may interface with any load sharing facility (LSF) application, which allows evaluation of the number of secure logical storage partitions that may be required within a cell to complete all pending jobs within a predetermined time frame. In another embodiment, clients 20 and/or 30 may include a graphical user interface (GUI) from which users may request access to secure logical storage partitions.

In a particular embodiment, secure switched network 40 may be implemented with an administrative module 50, an secure file server (SFS) module 60, and a disk array module 70. Administrative module 50 may be used to facilitate the management of secure logical storage partitions and the creation and maintenance of customer accounts and access control through Internet 15. In the embodiment illustrated in FIG. 1, administrative module 50 includes a virtual private network (VPN) termination device/router 52, firewall 51, and public key server 53. In addition, administrative module 50 includes one or more configuration servers 54 that provide network and/or storage configuration and a Layer 2 switch 55 for directing data at the OSI data link layer to its final destination. One example of a switch 55 includes the 6509 network switch with MSFC available from Cisco Systems, Inc. These switches may be described as "VLAN-capable".

It also may be illustrative to discuss the usage of additional terms. For example, a cell may be defined as any collection of networked resources that is securely isolated from other networked resources using network isolation techniques such as VLANS unless a connection is explicitly established between them. Cells and clients may be established as one-to-one, one-to-many, or many-to-one, or many-to-many relationships. That is, one or more cells may be associated with one or more clients 20 and/or 30, depending on the application. A connection may be defined as a network path from one logical or physical network to another. For example, a connection may be from one secure file server (SFS) to another, or a particular SFS 61 to a LUN 71, and may be, for example, a virtual private network (VPN), virtual interface, routing path, or a combination thereof. A connection may be established electronically, optically or otherwise using a variety of known methods. Configuration server 54 is operable to control a connection to selected ones of LUNs 71-73 to a cell designated for a particular client.

Cells may be implemented using a variety of methods. For example, one method for implementing a cell is disclosed in U.S. patent application Ser. No. 09/678,933 for a HIGHLY SECURE COMPUTER SYSTEM ARCHITECURE FOR A HETEROGENEOUS CLIENT ENVIRONMENT of Robert P. Martin et al. As another example, in a particular embodiment, cells may be implemented as port-based VLANs including, but not limited to, port-based VLAN's, media access controller (MAC) addressed-based VLAN's, tag-based VLAN's and other methods. For illustrative purposes and not by limitation, aspects of the present invention are described using cells implemented using VLANs. VLAN's are typically preferably configured to a delimited range of attributes such as IP addresses or ports, and thus may send or receive packets only to those attributes such as IP addresses or ports in each of their delimited ranges. Without routing enabled, a VLAN may not send or receive packets to other VLAN's. Thus, in a particular embodiment, VLAN cells may be securely isolated from one another by not enabling routing. One method for establishing such cells is discussed in conjunction with FIG. 2, and an example of a logical architecture that illustrates such cells is discussed in conjunction with FIG. 3.

Devices such as a firewall 51 and/or a VPN termination device/router 52 may be used to limit network traffic to limited network or broadcast domains to improve performance and to securely isolate data traffic of one or more clients 20 and/or 30 as desired. One example of a firewall 51 may be a VPN termination device or router with a firewall such as a PIX firewall manufactured by Cisco Systems, Inc. These routers may be described as "VPN-capable". Data from client 20 may first pass through firewall 51, which performs standard functions of a firewall at the perimeter of a secure site, rejecting unauthorized network traffic by filtering out or passing data. Firewall 51 may, for example, examine all network packets and determine whether they should be forwarded to their final destination. In a particular embodiment, unauthorized requests may be systematically dropped according to a set of filtering rules configured by a system administrator.

In a particular embodiment, firewall 51 may be electrically connected to a public key server 53, which may be used with private keys to facilitate ensuring that only intended recipients may read confidential information in secure storage access system 10. Any one of a variety of key-based server systems and devices now known in the art or that may be developed in the future may be used.

Alternatively or in addition, VPN termination device/router 52 may satisfy a variety of security and/or performance needs. For example, VPN termination device/router 52 may establish a virtual private network for each client 20 and/or 30 and may be particularly useful for Internet connections to provide a secure connection during transmission of data and/or encrypting of outgoing data and filtering and decryption of incoming data. Each connection within VPN termination device/router 52 may be associated with specific cells to establish secure connections within secure switched network 40. VPN termination device/router 52 associates address information on data packets with physical data ports on switch 55. This configuration enables switch 55 to direct data packets to a correct data port on the switch if the data packets are directed to an established network device such as SFS 61, or to discard data packets otherwise. VPN functions may be included in VPN-capable routers or in any other Layer 3 network devices, such as a 5001 router available from Cisco Systems, Inc. VPN termination device/router 52 may also perform an authentication function to verify the identity of one or more clients before any client connections are established to any new secure logical storage partitions designated as LUNs. As one example, VPN termination device/router 52 may access an authentication function via a hard-wired local area network (LAN) connection, may decrypt encrypted data from one of clients 20 and/or 30 based on this authentication information, and/or may verify that the specified destination IP address on secure storage access system 10 is valid for that client. In addition, VPN termination device/router 52 may be either a hardware or software termination device, and may use different encryption keys for various clients, depending on the application.

Data is passed through one or more of firewall 51, VPN termination device/router 52, and/or public key server 53 to one or more configuration servers 54 that each may host logic, or logic module59. Configuration server 54 dynamically configures secure switched network 40 to securely associate selected ones of LUNs as desired with one or more computers such as SFS 61-64 in a cell that is accessible by one or more clients 20 and/or 30, while isolating the resources of each of clients 20 and/or 30 in secure storage access system 10 from one another. Associating selected ones of LUNs as desired with one or more computers such as SFS 61-64 in a cell that is accessible by one or more clients 20 and/or 30 provides for a connection to be utilized between a client and that selected LUN. In a particular embodiment and as an example, a LUN 71 may be allowed access by one or more SFSs 61-64 by using an access control list (ACL). In this way, a Fibre Channel device such as high-speed switch 65 may limit access to LUN 71 solely to those cells that contain SFS 61-64 and whose worldwide names (WWNs) are included in the ACL. The ACL may be resident on one or more devices such as, but not limited to, high-speed switch 65, and/or disk array controller 74. A LUN ACL may then specify all cells that have access to each LUN. Because clients are connected to cells, and file servers are in cells, access to the secure logical storage partitions is restricted to servers in the cells, access of the LUNs is then restricted to those clients associated with the cells.

Configuration server 54 includes logic 59, which may include one or more processing modules and preferably includes computer readable program code for automatically configuring secure switched network 40. Logic 59 may reside in one or more modules in configuration server 54 and/or in other subsystems, may allow administrators to assign secure logical storage partitions to particular cells that are connected to clients 20 and/or 30, and may simplify the management of all of the elements within administrative module 50. For example, logic 59 may provide a simple, common, and easy-to-use user interface that may be used to create cells that include particular LUNs and secure file servers (SFSs), and manage storage assignment and/or security. Alternatively or in addition, logic 59 may also be used to monitor resource consumption and appropriately bill various clients for such consumption. Logic 59 may be executed on a computer or other processor, may receive requests for access to secure logical storage partitions from each of clients 20 and/or 30 and automatically allocate one or more LUNs 71-73 for clients 20 and/or 30 as desired according to a variety of factors, including load balancing, priority, security, and resource availability. For example, configuration server 54 may be a software system implemented using a distributed component or service model such as, but not limited to, e-Speak, Enterprise JavaBeans, or CORBA. Configuration server 54 may advertise the services it provides and provide a network interface for each of clients 20 and/or 30 to invoke over Internet 15 to request, remove, and/or modify secure logical storage partitions as desired. Configuration server 54 may also invoke interfaces in sub-systems that have the ability to configure network cells and connections, format secure logical storage partitions designated as LUNs, and/or invoke applications to format LUNs 71-73. These interfaces may be programming language interfaces such as a JAVA interface or XML Schema. One method for performing such dynamic configuration is discussed in conjunction with FIG. 2.

In the embodiment illustrated in FIG. 1, SFS module 60 includes one or more SFSs, each of which is coupled to switch 55 and to a high-speed switch 65. Each of SFS 61-64 may include one or more computer resources such as a server or workstation and utilize any software system, including a distributed component model or service model such as, but not limited to, e-Speak, Enterprise Java Beans, or CORBA and which includes an interface provided by configuration server 54. SFSs and LUNs may be established as one-to-one, one-to-many, or many-to-one, or many-to-many relationships. That is, one or more LUNs 71-73 may be associated with SFS 61-64 within one cell, or SFS in more than one cell, according to the application. In a particular embodiment, high-speed switch 65 and/or SFS 61-64 may segregate network traffic between individual SFSs 61-64. For example, access by SFSs to LUNs may be controlled utilizing properties of Layer 2 devices using a variety of networking technologies now known for that may be developed in the future.

Layer 2 is known as the data link layer within the Ethernet standard, and the signal protocol level within the FibreChannel standard. Layer 2 devices serve to provide procedural and functional means to establish, maintain, and release data-link connections between network nodes or entities. These devices also provide data frame or packet transfer functions such as serving to split data into frames, send the data on the physical layer, receive acknowledgment frames, perform error checking, and retransmit frames not received correctly.

With the Ethernet standard, layer 2 includes a media access control (MAC) sublayer, which network devices use to find recipients of data. Within the FiberChannel standard, layer 2 includes a WWN that network devices use to find recipients of data. Elements in an Ethernet network have unique MAC addresses, and elements in a Fiber Channel network have unique WWNs. MAC addresses and WWNs may be hard coded on layer 2 devices such as a network interface card (NIC) or Fibre Channel card.

Thus, for example, access may be governed by use of media access control (MAC) or IP addresses, or with the use as a WWN. For example, in a particular embodiment, access on an Ethernet network may be governed by a device's MAC address, a six-byte number unique to each NIC, while access on network utilizing FibreChannel technology may be governed by WWNs as identifiers. This may ensure that the same data is isolated between, and not accessed by, different SFSs. In a particular embodiment, high-speed switch 65 conforms to the Fibre Channel standards developed by the American National Standards Institute (ANSI). Each of SFS 61-64 may be connected to switches 55 and 65 through any suitable high-speed network interface to allow SFS 61-64 to perform file-sharing operations as desired. In a particular embodiment, each SFS 61-64 may be uniquely identified using, by example and not by limitation, a WWN, an IP address, or an Ethernet media access control (MAC) address that may be used by switch 65 as a unique identifier. One method for associating a LUN with a cell that has an SFS is discussed in further detail in conjunction with FIG. 2.

In the embodiment illustrated in FIG. 1, disk array module 70 includes a controller 74 operable to control access to a plurality of LUNs 71-73. Disk array module 70 may be used to provide high-performance and high-capacity storage access to clients 20 and 30 as desired. In a particular embodiment, disk array controller may be an XP512 controller available from HP. System storage capacity may be segmented into logical storage partitions or LUNs and associated with cells that contain SFSs and that are connected to clients.

Any number of LUNs 71-73 in secure storage access system 10 may be connected to each of clients 20 and/or 30 through secure switched network 40. To illustrate, SFSs and LUNs may be established as one-to-one, one-to-many, or many-to-one, or many-to-many relationships. By associating LUNs with SFSs that are in a cell and associating that cell with clients, LUNs and clients may also thus be established as desired as one-to-one, one-to-many, or many-to-one, or many-to-many relationships, depending on the application. In this embodiment, three available LUNs 71-73 are illustrated as available to secure switched network 40. For illustrative purposes, it may be assumed that LUN 71 has been assigned to a cell connected to client 20 and LUN 72 has been assigned to a cell connected to client 30. VPN termination device/router 52 may employ tunneling technology to give clients 20 and 30 seamless access to their assigned LUNs 71 and 72. For example, using VPN termination device/router 52, clients 20 and 30 may logically see LUNs 71 and 72, respectively, as part of their network domain. One example of such a seamless logical configuration where the network domain for client 20 is extended around LUN 71 so that client 20 and LUN 71 may access one another is discussed in further detail in conjunction with FIG. 3. Network domains for other clients may be extended around other LUNs. These network domains may then be isolated from one another inside cells within secure storage access system 10.

Using the unique identifier discussed above, disk array controller 74 may be used to restrict access to LUN 71 or 72 to a specific, uniquely-identified SFS 61-64, and from the uniquely-identified SFS 61-64 to a specified client. As one example, logic 59 may restrict access to a LUN 71 by associating client 20 and a cell that contains a uniquely-identified SFS 61, and associating SFS 61 with LUN 71. These associations may be provided using many methods such as an ACL used by a device such as disk array controller 74. A LUN ACL may then specify all clients that have access to each LUN.

Although FIG. 1 illustrates a particular embodiment, the implementation of secure switched network 40 may be performed in many ways, and is application-dependent. For example, in some cases such as where secure storage access system 10 includes clients 20 and 30 internal to an organization, it may not be necessary to utilize selected components. In such a scenario, configuring secure switched network 40 may be performed, for example, without the use of VPNs and/or functions such as encryption and/or decryption of data to/from secure switched network 40.

In other embodiments, secure switched network 40 may include additional clients for which operations may similarly seamlessly run. For example, secure switched network 40 may also include a variety of other clients (not explicitly shown) that may either share or not share data through secure switched network 40 as desired. These clients may be connected through the same or additional VPN termination device/router 52 and/or switches 55 and/or 65 to LUNs and SFSs that may be similarly configured as desired. That is, secure switched network 40 may also include multiple VPNs and VLANs as desired to provide support for one or many enterprise entities and/or clients. Additional physical connections through devices such as VPN termination device/router 52, configuration server 54, switches 55 and 65, and disk array controller 74 may also be used to, for example, provide redundancy and/or a given level of overall network throughput. By automatically making available additional storage capacity to any number of clients, automatically configuring secure logical storage partitions and updating applicable databases, clients may operate seamlessly as desired.

Figure 2:
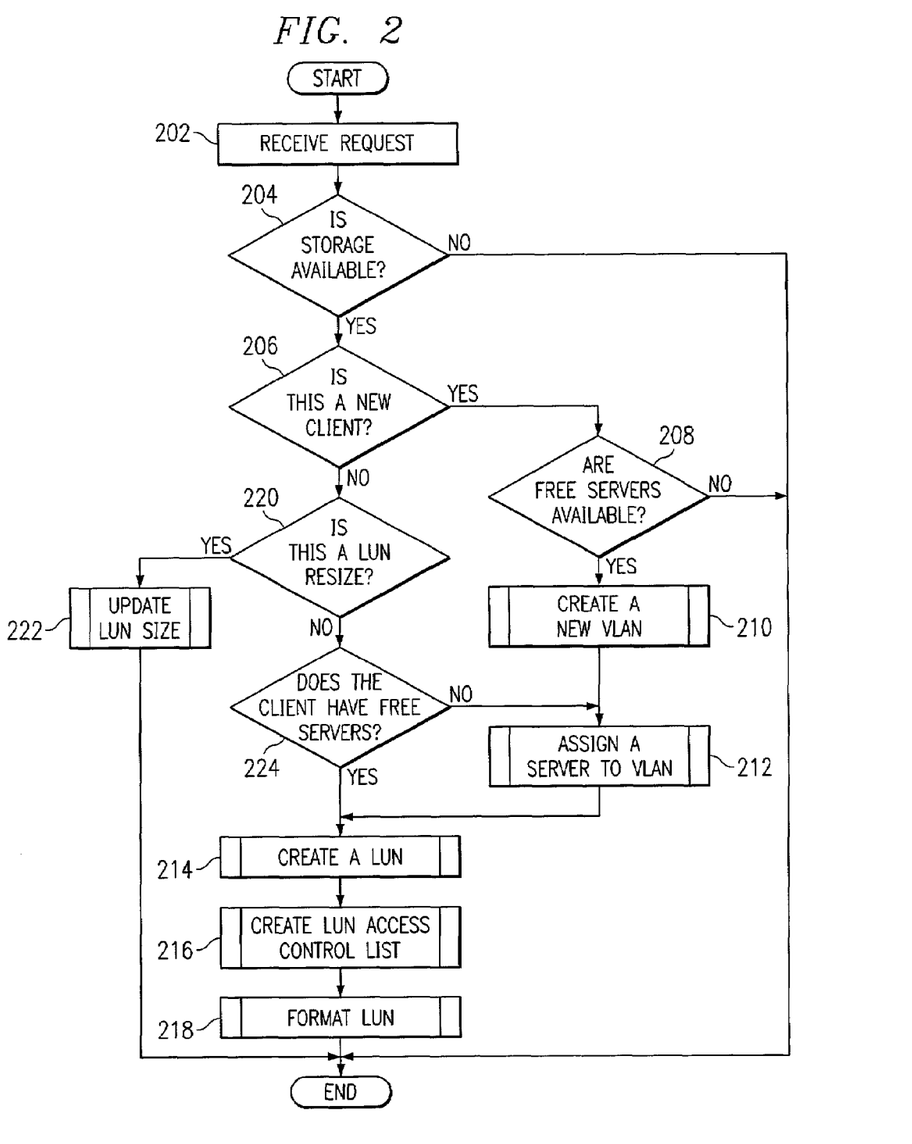
FIG. 2 illustrates an example of a method for automating the configuration of network and storage devices to provide secure access to secure logical storage partitions on a network according to an embodiment of the present invention.

FIG. 2 illustrates an example of a method for automating the configuration of network and storage devices to provide secure access to logical storage partitions on a network. Generally, the method includes receiving a request for access to storage and providing storage capacity in response to the request, and assumes the availability of a pool of free secure logical storage partitions that may be designated or created as LUNs 71-73 and that each of these LUNs may be configured with any applicable formatted structure. In some applications, the method may include establishing an account and one or more cells or VLANs for each client as a precondition. Various embodiments may utilize fewer or more steps, and the method may be performed using a number of different implementations, depending on the application. Configuration of the devices such as switches 55 and/or 65 necessary for various steps, such as the creation of a new VLAN, may be performed, or caused to be performed, automatically by logic 59 in configuration server 54.

In step 202, a request for access to storage is received. A request for access to secure logical storage partitions may be provided in one of many forms, such as phone or email or other electronic format. The request may follow one of many well-defined processes for requesting and negotiating services using XML document exchanges, such as specified in the e-Speak Service Framework Specification (v. 2.0, dated Feb. 9, 2001), developed by HP. The request may be received and processed by logic 59 in configuration server 54, by a system administrator, or both. In step 204, the method queries whether storage capacity is available. As one example, storage capacity may be an amount of space required for a specific task, such as a large data transfer, or an amount of space required generally, such as a number of gigabytes available on a specified secure logical storage partition. This step may be performed using a variety of methods, including invoking an interface such as a JAVA interface resident or running on configuration server 54, or by sending an XML document to configuration server 54. If no storage is available, the method ends.

If storage capacity is available, in step 206, the method queries whether the request is received from a new client. If the request is not received from a new client, the method proceeds to step 220. On the other hand, if the request is received from a new client, the method proceeds to step 208, where the method queries whether free SFSs are available. If free SFSs are available, the method creates a new VLAN in step 210, and in step 212, the method assigns a SFS to a cell or VLAN. As one example, logic 59 may create a new VLAN by assigning a one-to-one relationship between a client 20 and a SFS 62. This relationship may be provided using many methods such as one or more access control lists (ACLs) used by a device such as switches 55 and 65. SFS 62 may be uniquely identified using any identifier such as, but not limited to, a WWN, IP address, or an Ethernet media access control (MAC) address that may be used by switch 65 as a unique identifier. Using this unique identifier, client 20 may access an assigned LUN through SFS 62, switches 55 and 65, and disk array controller 74. One or more ACLs may then specify all clients that have access to each SFS. One example of a logical architecture that illustrates two VLANs is discussed in conjunction with FIG. 3. If free SFSs are not available, the method ends.

In step 214, the method creates a LUN in module 70. As one example, logic 59 may cause a LUN to be created, by providing for disk array controller 74 to assign one or more secure logical storage partitions such as disks to be a LUN. In a particular embodiment, a portion of a secure logical storage partition, such as a disk partition, may be assigned by disk array controller 74 to be a LUN. By way of example and not by limitation, in step 216, the method may modify or create a LUN access control list (ACL) that specifies all client nodes having access to each LUN, all SFSs having access to each LUN, or a combination of the above. In step 218, the method formats the LUN by one of a variety of known methods. The method then ends.

On the other hand, if in step 206 the request is not received from a new client, the method assumes that a LUN has been assigned to an existing client. In step 220 the method queries whether the LUN assigned to the existing client needs to be resized. If so, the method updates the LUN size in step 222, and the method then ends. If the LUN does not need resizing in step 220, the method queries whether the client has SFS capacity allocated to it in step 224. If the client does not have free SFSs, the method proceeds to assign a SFS to a VLAN in step 212. As one example, this relationship may be provided by associating a LUN with a uniquely identified SFS, and associating the cell having the uniquely identified SFS with the client connected to the cell. These associations may be provided using many methods such as an access control list (ACL) used by a device such as disk array controller 74, switch 65, and switch 55. If the client has SFS capacity, the method proceeds to step 214 to create a LUN as discussed above. The created LUN will be assigned to an available SFS, and the cell having the SFS is then associated with the client.

Figure 3:
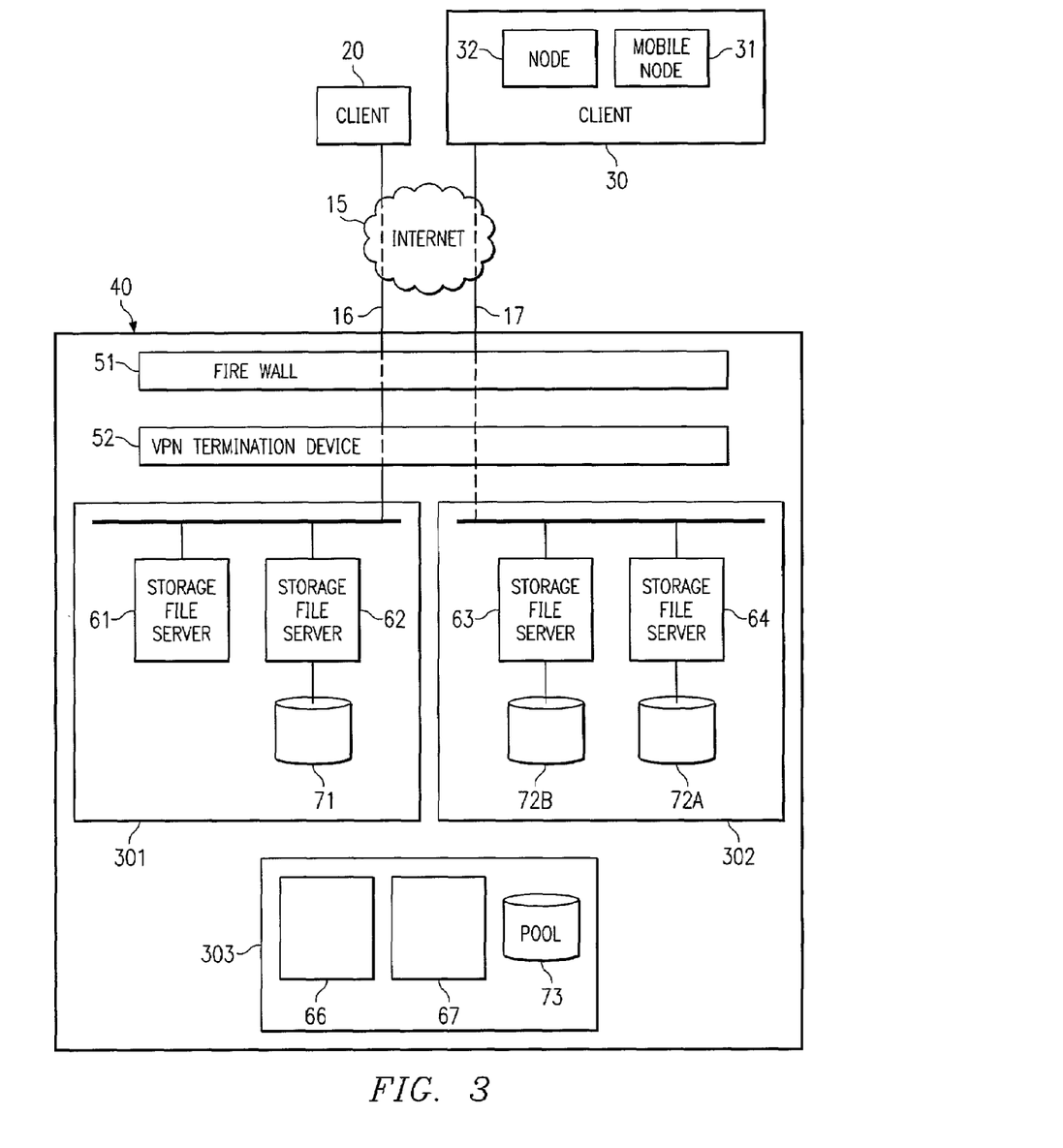
FIG. 3 illustrates an example of a logical architecture that provides secure access of network logical storage partitions according to an embodiment of the present invention.

FIG. 3 illustrates an example of a logical architecture that provides secure access of network logical storage partitions as contemplated by the present invention. Networks such as the network domains, cells, and VLANs discussed herein are connections, or network paths, between computer systems and resources whereas network devices, such as VPN termination device/router 52 and switch 55, are devices that establish and support networks. Network devices are physical, whereas networks are logical. Once clients 20 and 30 have been configured, each has access to compute and secure logical storage partitions as desired. As one example, tunneling technology utilizing the Point-to-Point-Tunneling Protocol (PPTP) may be used so that these resources appear as if they were on the network for each client 20 and/or 30. This technology may also be used to logically segregate resources for client 20 from client 30. By automatically making available additional LUNs to one or more clients, automatically formatting selected ones of these LUNs and updating applicable databases, clients may operate seamlessly as desired.

FIG. 3 illustrates that client 20 is electronically connected via logical path 16 to secure switched network 40 through firewall 51 and VPN termination device/router 52 to SFSs 61 and 62 and LUN 71 in cell or VLAN 301. Similarly, client 30 is connected, for example electronically or optically, via logical path 17 through firewall 51 and VPN termination device/router 52 to SFSs 63 and 64 and LUNs 72A and 72B in cell or VLAN 302. LUNs 72A and 72B are used to illustrate that partitioning of a single secure logical storage partition into two LUNs may be performed for the same client while serving the separate partitions with separate SFSs. As one example, mobile node 31 may be assigned SFS 64 to service LUN 72A, while node 32 is assigned SFS 63 to service LUN 72B. Switches 55 and 65 may be configured to set up proper routing for the logical VLANs 301, 302, and 303 illustrated in FIG. 3 and are thus for convenience not illustrated in FIG. 3.

As illustrated in FIG. 3, VLANs or cells 301 and 302 are secure and isolated networks in secure storage access system 10. Each VLAN 301 and 302 connects LUNs 71 and 72 respectively to SFS 61 and 62 and SFS 63 and 64 in secure switched network 40, and allows access to and from respective clients 20 and 30. Each VLAN 301 and 302 may be implemented using a variety of configurations, and may be associated with several isolated VPN connections established by one or more VPN termination devices/routers 52. As discussed above in conjunction with FIGS. 1 and 2, secure switched network 40 associates address information on data packets with physical data ports on switches 55 and 65, which enables data packets to be directed to the correct data port on each switch if the data packets are directed to an established cell such as VLAN 301 or VLAN 302, or to discard data packets otherwise. The associations between SFSs and LUNs discussed above allow disk array controller 74 to limit access to each LUN in a VLAN to the client in that VLAN. For example, LUN 71 may be isolated from other cells, and is configured to allow no network access other than by configuration server 54 and client 20, while LUN 72 is isolated from other cells and configured to allow no network access other than by configuration server 54 and client 30.

VLAN 303 represents a free pool of resources of one or more LUNs 73 and additional SFSs 66 and 67 from which requests from each of clients 20 and/or 30 or other clients may be satisfied. VLAN 303, SFS 66 and 67 and LUN 73 associated with it, may be configured in the embodiment illustrated in FIG. 3 to not receive traffic to or from, either or both of clients 20 and/or 30. For example, by using switches 55 and 65 (for example, not enabling routing), SFS 66, SFS 67, and LUN 73 may allow no network access other than by configuration server 54 and may be electrically isolated from the remainder of secure switched network 40. In this way, LUN 73 may be isolated from other cells as a free pool of available storage capacity for later allocation and configuration as desired, and may be configured to allow access by a client by configuration server 54 using a method such as the one discussed in conjunction with FIG. 2.

Although clients 20 and 30 are illustrated in FIG. 3 as electronically connected to respective LUNs 71 and 72, each of clients 20 and 30 may be connected by a variety of methods to any number of LUNs, depending on the application. Moreover, more or fewer SFSs may be assigned to each LUN as desired, depending on capacity, workload, and other factors. Additional storage capacity may be further allocated to additional clients (not explicitly shown) by simply associating available SFS 66, SFS 67, with a LUN 73 in the cell associated with the client as discussed in conjunction with FIGS. 1 and 2.

What is claimed is:

1. A method for providing secure access to network logical storage partitions, comprising:
   automatically associating at least one of a plurality of secure logical storage partitions in a storage device in a network with at least one of a plurality of uniquely identified servers in a cell in the network in response to a request for storage over the network;
   automatically associating the cell with at least one client using network isolation of the cell; and
   using network isolation of the storage device to restrict access to the at least one of the plurality of secure logical storage partitions to the one of the plurality of uniquely identified servers in the cell.

2. The method of claim 1, further comprising:
   determining whether storage capacity is available for the at least one client in response to the request, and
   automatically creating the cell if the cell does not already exist.

3. The method of claim 1, further comprising associating the at least one of the plurality of secure logical storage partitions with the at least one of the plurality of uniquely identified servers by:
   identifying the at least one of the plurality of secure logical storage partitions in an access control list of a disk array controller operable to access the at least one of the plurality of secure logical storage partitions; and
   associating the at least one of the plurality of secure logical storage partitions with the at least one of the plurality of uniquely identifier servers in a switch operable to electronically connect to the disk array controller and to the at least one of the plurality of uniquely identified servers.

4. The method of claim 1, wherein the cell comprises an isolated virtual local area network.

5. The method of claim 1, further comprising using network isolation of the storage device to restrict access to the at least one of the plurality of secure logical storage partitions by employing at least one access control list at a layer 2 device in the network.

6. The method of claim 1, further comprising using network isolation of the storage device to restrict access to the at least one of the plurality of secure logical storage partitions by employing at least one access control list at a layer 3 device in the network.

7. The method of claim 1, further comprising using network isolation of the storage device to restrict access to the at least one of the plurality of secure logical storage partitions by employing at least one access control list at a layer 2 device that employs at least one of the Fibre Channel standards.

8. The method of claim 1, further comprising using network isolation of the cell by assigning at least one port to a virtual local area network.

9. A secure storage access configuration module, comprising:
   a processing module residing in a network, the network comprising a plurality of secure logical storage partitions in a storage device and a plurality of uniquely identified servers;
   a logic module residing on the processing module and operable to receive a request for storage over the network from at least one client;
   automatically associate at least one of the plurality of secure logical storage partitions in the network with at least one of the plurality of uniquely identified servers in a cell in the network in response to the request;
   automatically associate the cell with the at least one client using network isolation of the cell; and
   use network isolation of the storage device to restrict access to the at least one of the plurality of secure logical storage partitions to the one of the plurality of uniquely identified servers in the cell.

10. The module of claim 9, wherein the logical module is operable to use network isolation to restrict access to the at least one of the plurality of secure logical storage partitions by employing at least one access control list at a layer 2 device in the network.

11. The module of claim 9, wherein the logical module is operable to use network isolation to restrict access to the at least one of the plurality of secure logical storage partitions by employing at least one access control list at a layer 3 device in the network.

12. The module of claim 9, wherein the logical module is operable to use network isolation of the storage device to restrict access to the at least one of the plurality of secure logical storage partitions by employing at least one access control list at a layer 2 device that employs at least one of the Fibre Channel standards.

13. The module of claim 9, wherein the logic module is operable to use network isolation of the cell by assigning at least one port to a virtual local area network.

14. The module of claim 9, wherein the logical module is further operable to:
   associate a second at least one of the plurality of secure logical storage partitions in the network with the at least one of the plurality of uniquely identified servers in the cell, and
   wherein access to the second at least one of the plurality of secure logical storage partitions is restricted to the at least one of the plurality of uniquely identified servers in the second cell.

15. The module of claim 9, wherein the logic module is accessed by the at least one client in a distributed network environment.

16. The module of claim 9, wherein the logic module is further operable to:
   associate a second at least one of the plurality of secure logical storage partitions in the network with a second at least one of the plurality of uniquely identified servers in a second cell in the network,
   associate the second at least one of the plurality of uniquely identified servers with at least one second client, and
   wherein access to the second at least one of the plurality of secure logical storage partitions is restricted to the second at least one of the plurality of uniquely identified servers in the second cell.

17. The module of claim 9, wherein the cell comprises an isolated virtual local area network.

18. The module of claim 9, wherein the logic is further operable to receive a request for storage over the network;

determine whether storage capacity is available for the client, and create the cell if the cell does not already exist.

19. A secure network storage access system, comprising:
a secure file server module having a plurality of uniquely identified servers;
a disk array module coupled to the secure file server module, the disk array module having a plurality of secure logical storage partitions; and
an administrative module coupled to the secure file server module, the administrative module operable to
automatically associate at least one of a plurality of secure logical storage partitions in the disk array module in the network with at least one of a plurality of uniquely identified servers in a cell in the network,
automatically associate the cell with at least one client using network isolation of the cell, and
use network isolation of the disk array module to restrict access to the at least one of the plurality of secure logical storage partitions to the one of the plurality of uniquely identified servers in the cell.

20. The system of claim 19, wherein the disk array module comprises a disk array controller coupled to the at least one of the plurality of secure logical storage partitions associated with the at least one of the plurality of uniquely identified servers.

21. The system of claim 19, wherein the cell comprises at lease one isolated virtual local area network.

22. The system of claim 19, wherein the administrative module is further operable to receive a request for storage access from the least one client.

23. The system of claim 19, wherein the administrative module is operable to use network isolation of the disk array module to restrict access to the at least one of the plurality of secure logical storage partitions by employing at least one access control list at a layer 2 device in the network.

24. The system of claim 19, wherein the administrative module is operable to use network isolation of the disk array module to restrict access to the at least one of the plurality of secure logical storage partitions by employing at least one access control list at a layer 3 device in the network.

25. The system of claim 19, wherein the administrative module is operable to use network isolation in the disk array module to restrict access to the at least one of the plurality of secure logical storage partitions by employing at least one access control list at a layer 2 device that employs at least one of the Fibre Channel standards.

26. The system of claim 19, wherein the administrative module is operable to use network isolation of the cell by assigning at least one port to a virtual local area network.

* * * * *

UNITED STATES PATENT AND TRADEMARK OFFICE
CERTIFICATE OF CORRECTION

PATENT NO.        : 7,500,069 B2
APPLICATION NO.   : 09/954352
DATED             : March 3, 2009
INVENTOR(S)       : Roland M. Hochmuth et al.

It is certified that error appears in the above-identified patent and that said Letters Patent is hereby corrected as shown below:

In column 13, line 32, in Claim 2, delete "request," and insert -- request; --, therefor.

In column 13, line 45, in Claim 3, delete "identifier" and insert -- identified --, therefor.

In column 14, line 20, in Claim 10, delete "logical" and insert -- logic --, therefor.

In column 14, line 25, in Claim 11, delete "logical" and insert -- logic --, therefor.

In column 14, line 30, in Claim 12, delete "logical" and insert -- logic --, therefor.

In column 14, line 39, in Claim 14, delete "logical" and insert -- logic --, therefor.

In column 15, line 2, in Claim 18, delete "client," and insert -- client; --, therefor.

In column 16, line 2, in Claim 21, delete "lease" and insert -- least --, therefor.

In column 16, line 5, in Claim 22, after "the" insert -- at --.

Signed and Sealed this

Twenty-eighth Day of July, 2009

JOHN DOLL
*Acting Director of the United States Patent and Trademark Office*